United States Patent
Lung et al.

(10) Patent No.: US 10,607,626 B1
(45) Date of Patent: Mar. 31, 2020

(54) METHOD TO REMOVE BACKGROUND AND SENSOR OVERLOAD ARTIFACTS

(71) Applicant: Ford Motor Company, Dearborn, MI (US)

(72) Inventors: Ricardo Lung, Plymouth, MI (US); David Gravel, Clarkston, MI (US); Douglas K. Grimes, Commerce Township, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/196,129

(22) Filed: Nov. 20, 2018

(51) Int. Cl.
*G10L 21/0232* (2013.01)
*H04R 29/00* (2006.01)

(52) U.S. Cl.
CPC ........ *G10L 21/0232* (2013.01); *H04R 29/004* (2013.01)

(58) Field of Classification Search
None
See application file for complete search history.

(56) References Cited

U.S. PATENT DOCUMENTS

| | | | |
|---|---|---|---|
| 6,865,466 | B2 | 3/2005 | Voight et al. |
| 7,099,782 | B2 | 8/2006 | Hitchcock et al. |
| 8,347,856 | B2 | 1/2013 | Leone et al. |
| 2004/0243351 | A1 | 12/2004 | Calkins et al. |
| 2005/0177352 | A1* | 8/2005 | Gravel .............. G01H 3/08 703/2 |
| 2009/0193900 | A1* | 8/2009 | Janssens ............ G01H 1/003 73/649 |

FOREIGN PATENT DOCUMENTS

| | | |
|---|---|---|
| CN | 104792519 | 7/2015 |
| CN | 106124197 | 11/2016 |
| CN | 106124198 | 11/2016 |

OTHER PUBLICATIONS

Wu, X.B., Computed Order Tracking and its Application to NVH, Applied Mechanics and Materials, vols. 321-324, pp. 692-696, 2013, available at URL https://doi.org/10.4028/www.scientific.net/AMM.321-324.692.

* cited by examiner

*Primary Examiner* — Paul W Huber
(74) *Attorney, Agent, or Firm* — Burris Law, PLLC

(57) ABSTRACT

A method includes: executing an order tracking process of a measured noise signal at an nth order and at least one adjacent order to obtain an nth tracked signal and an interference signal based on an adjacent tracked signal of the at least one adjacent order, and extracting the interference signal from the nth tracked signal to obtain a refined nth order tracked signal.

20 Claims, 5 Drawing Sheets

METHOD TO REMOVE BACKGROUND AND SENSOR OVERLOAD ARTIFACTS

FIELD

The present disclosure relates to systems and methods for processing signals, and more particularly to systems and methods for processing and analyzing noise and vibration phenomena in machinery.

BACKGROUND

The statements in this section merely provide background information related to the present disclosure and may not constitute prior art.

Noise, vibration, and harshness (NVH) data are used to analyze the noise and vibration characteristics of vehicles in order to reduce the amount of disturbance to a user or the environment. While noise and vibration can be readily measured, harshness is a subjective quality. Order tracking is one of signal processing tools for analyzing sound and vibration phenomena. Order tracking transforms a measured signal from time domain to angular (or order) domain.

The sound and vibration signals are frequently accompanied with background noises. Order tracking data with sensor overload and high background noise exhibit several bad characteristics. First, sensor overloads can invalidate the entire data set, wasting valuable time and effort spent in acquiring the data. Second, high background noise levels can put false artifacts in the order tracking data, leading to false conclusions of quality of the engine/transmission and the level of NVH present in the unit. Third, high background noise can mask the signal of interest, making it impossible to measure the actual values in the order tracking data.

The present disclosure addresses these issues and other issues related to analysis of vibration and noise signals.

SUMMARY

This section provides a general summary of the disclosure and is not a comprehensive disclosure of its full scope or all of its features.

In one form, a method is provided, which includes: executing an order tracking process of a measured noise signal at an nth order and at least one adjacent order to obtain an nth tracked signal and an interference signal based on an adjacent tracked signal of the at least one adjacent order, and extracting the interference signal from the nth tracked signal to obtain a refined nth order tracked signal.

In other features, the method further includes: executing the order tracking process on two adjacent orders to generate a first adjacent tracked signal and a second adjacent tracked signal; determining an average of the first and second adjacent tracked signals, as the interference signal; subtracting the interference signal from the nth tracked signal to obtain the refined nth order tracked signal; and classifying a noise quality of a machine based on the refined nth order tracked signal. The nth order is provided between the two adjacent orders. The nth order is an order of interest associated with a known component of a machine associated with the measured noise signal. The at least one adjacent order is unassociated with the machine. A scalar value of the refined nth order tracked signal for the nth order is calculated. The noise from the machine is recorded by a recording device, as the machine is being operated at one or more rotational speeds to obtain the measured noise signal. The measured noise signal recorded by the recording device is acquired by a controller to perform the executing of the order tracking process and the extracting of the interference signal from the nth tracked signal. The interference signal is indicative of background noise originating from environment conditions external of the machine.

In another form, a method for evaluating noise of a machine having one or more rotatable components is provided. The method includes: conducting an order tracking process on a measured noise signal at an nth order and at least two adjacent orders to obtain an nth tracked signal and at least two adjacent tracked signals; calculating an interference signal based on the at least two adjacent tracked signals; subtracting the interference signal from the nth order tracked signal to obtain a refined nth order tracked signal for the nth order; and assessing a noise quality of the machine based on the refined nth order tracked signal.

In still another form, a method includes: executing an order tracking process of a noise signal at an nth order and two adjacent orders to obtain an nth tracked signal and two adjacent tracked signals, wherein the nth order is between the two adjacent orders; and subtracting an interference signal from the nth tracked signal to obtain a refined nth tracked signal, wherein the interference signal is based on the two adjacent tracked signals.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
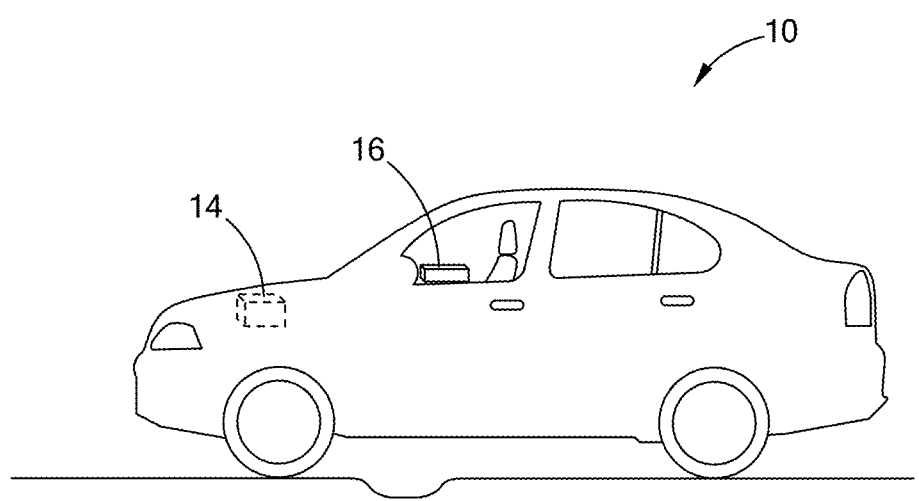
FIG. 1 is a schematic view of a vehicle including a machine having a rotatable component to be evaluated by a noise, vibration and harshness (NVH) analyzer constructed in accordance with teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a system and method for processing and analyzing noise and vibration signals in accordance with the teachings of the present disclosure may be used to evaluate noise, vibration and harshness (NVH) of a machine in a vehicle 10. The vehicle 10 includes various machines that have rotatable components that can be evaluated by an NVH analyzer 12 (shown in FIG. 2) of the present disclosure. The various machines include but are not limited to a pump, a front-end accessory drive, an engine, a transmission system, and a motor.

In the exemplary embodiment of the present disclosure, the NVH of a pump 14 in the vehicle 10 is evaluated. The vehicle 10 includes a recording device 16 to record the noise and vibration of the pump 14. It is understood that NVH analyzer 12 can be used to analyze noise and vibration of other machines in the vehicle 10. The recording device 16 may be connected to a tachometer or encoder that measures or estimates the instantaneous velocity and/or angular position of the shaft of the rotatable component of the pump 14.

Figure 2:
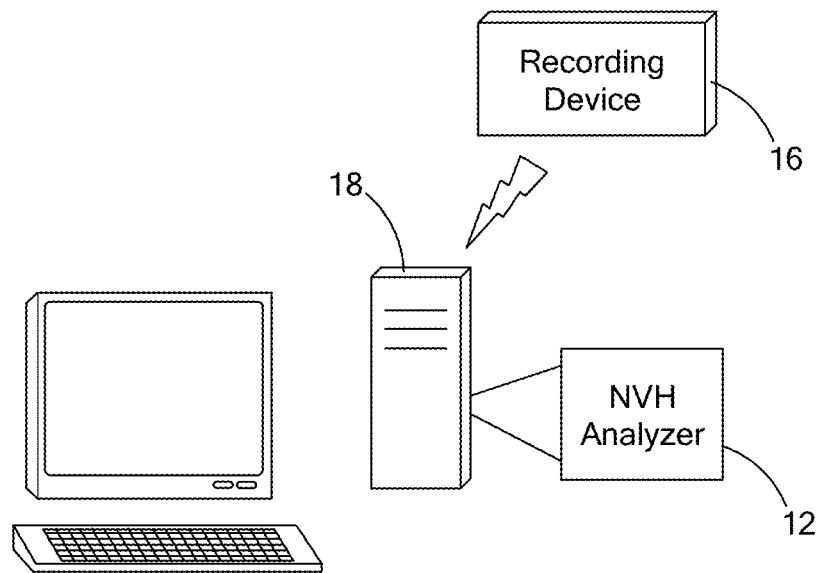
FIG. 2 is a schematic view showing working environment of the NVH analyzer.

Referring to FIG. 2, the NVH analyzer 12 constructed in accordance with the teachings of the present disclosure may receive the recorded data of the recording device 16 wireless or via wires. The NVH analyzer 12 may be connected to a computer 18.

Figure 3:
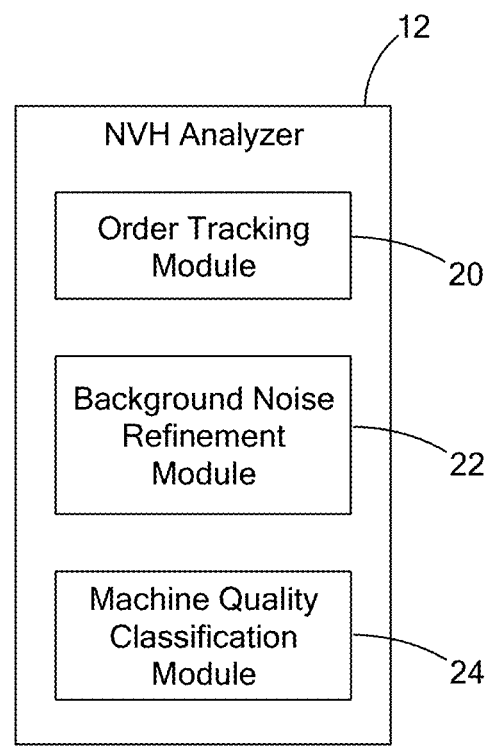
FIG. 3 is a block diagram of an NVH analyzer constructed in accordance with teachings of the present disclosure.

Referring to FIG. 3, the NVH analyzer 12 includes an order tracking module 20, a background noise refinement module 22, and a machine quality classification module 24. The order tracking module 20 receives measured noise signals from the recording device 16 and executes an order tracking process to obtain tracked signals of the nth order and two adjacent orders. The order tracking process transforms a measured signal from a time domain to an angular (or order) domain for analysis to detect vibration signatures indicative of actual or potential fault conditions. The transform from the time domain to the angular or order domain may be performed by a Fast Fourier Transform (FFT). Order tracking is applied to asynchronously sampled signal (with a constant sample rate in Hertz) to obtain the same signal sampled at a constant angular increment of a reference shaft. Order tracking is based on a velocity measurement, generally obtained by means of a tachometer or encoder, needed to estimate the instantaneous velocity and/or the angular position of the shaft.

The nth order is an order of interest associated with a known component of a machine (i.e., the pump 14 in the present disclosure) associated with the measured noise signal. The two adjacent orders include one order close to but below the order of interest, and one order close to but above the order of interest. The nth order is provided between the two adjacent orders. The two adjacent orders are unassociated with the pump 14 being evaluated.

The background noise refinement module 22 is configured to determine an average of the adjacent orders and subtract the average from the nth order tracked signals to obtain the refined nth order signal. The average is used as an interference signal, which is indicative of background noise originating from environmental conditions external of the machine being evaluated.

It is understood that the order tracking process may be executed on only one adjacent order, instead of two adjacent orders. The order of the only one adjacent order is subtracted from the nth order tracked signals to obtain the refined nth order signal. Alternatively, the order tracking process may be executed on a plurality of the adjacent orders to generate a plurality of tracked signals. The nth order is an order of interest associated with a known component of a machine (i.e., the pump 14 in the exemplary embodiment) associated with the measured noise signal. The plurality of adjacent orders are unassociated with the machine. An average of all adjacent tracked signals based on the plurality of adjacent tracked signals is determined as an interference signal and is subtracted from the nth order tracked signals to obtain the refined nth order signal.

The machine quality classification module 24 is configured to determine scalar value of the refined nth order signal and assign a noise quality to the machine based on the scalar value and a predefined classification table. The predefined classification table includes correlations between scalar values and noise quality. Based on the scalar value and the predefined classification table, the machine quality classification module 24 can determine whether the noise of the machine (i.e., the pump 14 in the exemplary embodiment) is within an acceptable range.

Figure 4:
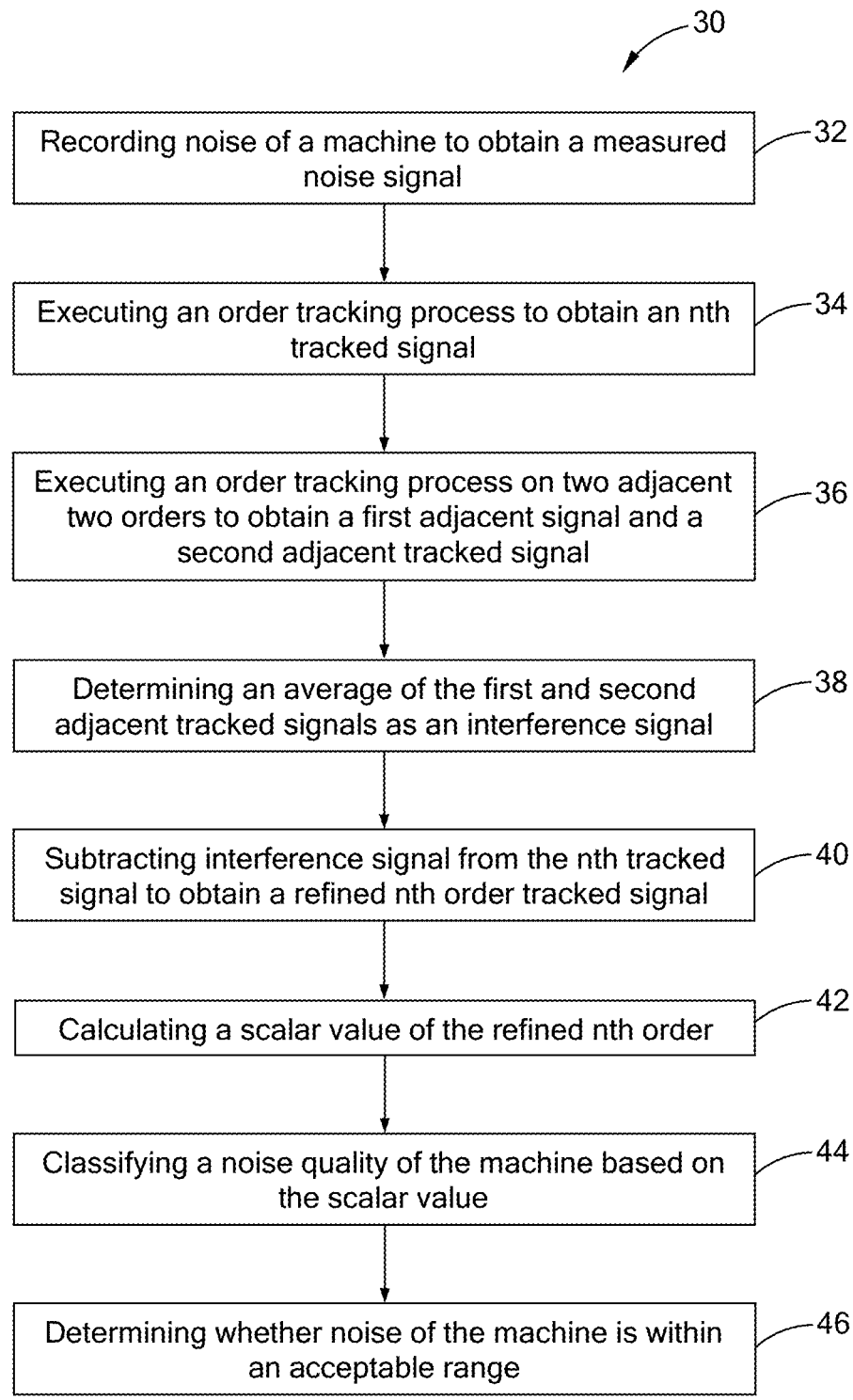
FIG. 4 is a flow chart of a method of evaluating NVH data of a machine having a rotatable component according to the present disclosure.

Referring to FIG. 4, a method 30 of processing and objectively evaluating the NVH of a machine that has rotatable components starts with recording noise of the machine to obtain a measured noise signal in step 32. The noise from the machine is recorded by a recording device 16 as the machine is being operated at one or more rotational speeds.

Next, an order tracking process of the measured noise signal is executed at an nth order to obtain an nth tracked signal in step 32. The nth order is an order of interest associated with a known component of a machine associated with the measured noise signal. The measured noise signal recorded by the recording device 16 may be acquired by a controller to perform the executing the order tracking process in step 34.

The order tracking process is also executed on two adjacent orders to generate a first adjacent tracked signal and a second adjacent tracked signal in step 36. The two adjacent orders include one order close to but below the order of interest, and one order close to but above the order of interest. The first and second adjacent tracked signals are unassociated with the pump 14 being evaluated.

Thereafter, an average of the first and second adjacent tracked signals are determined in step 38. The average is used as an interference signal, which is indicative of background noise originating from environmental conditions external of the machine. The interference signal is subtracted from the nth tracked signal to obtain a refined nth order tracked signal in step 40.

This background subtraction in the order tracking space has the effect of eliminating spurious spikes of data or data overloads caused by impulsive events (e.g. hitting a big bump in the road during a drive evaluation of the NVH) since these events are broad spectrum and have significant components across the entire frequency spectrum. Taking data at sidebands close to the order of interest insures the background subtraction is relevant and the magnitude of the average when subtracted represents the background noise.

A scalar value of the refined nth order tracked signal for the nth order is calculated in step 42. This scalar quantity is related to the energy at that order of interest without any background noise in the signal. A noise quality of the pump 14 is classified based on the scalar value of the refined nth order tracked signal in step 44. The predefined classification table correlates scalar value to a noise quality classification. As a result, it can be determined whether the noise of the pump 14 is within an acceptable range in step 46.

Figure 5:
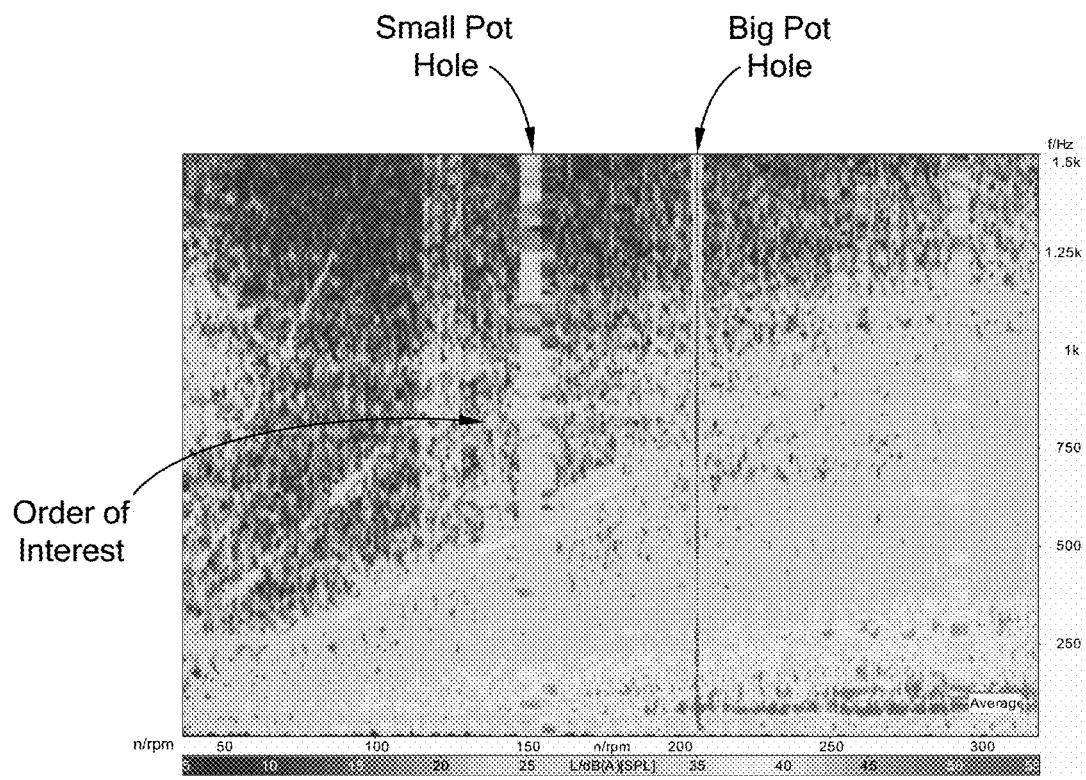
FIG. 5 is an order spectrum of noise signals of a machine being evaluated.

Referring to FIG. 5, the order spectrum of the noise signals of the pump 14 in the vehicle 10 is shown. The NVH signals are represented as order-based energy vs. RPM. As shown, when the vehicle 10 hit a big pot hole and a small pot hole, the big pot hole and the small pot hole cause spurious spikes in the noise signals.

Figure 6:
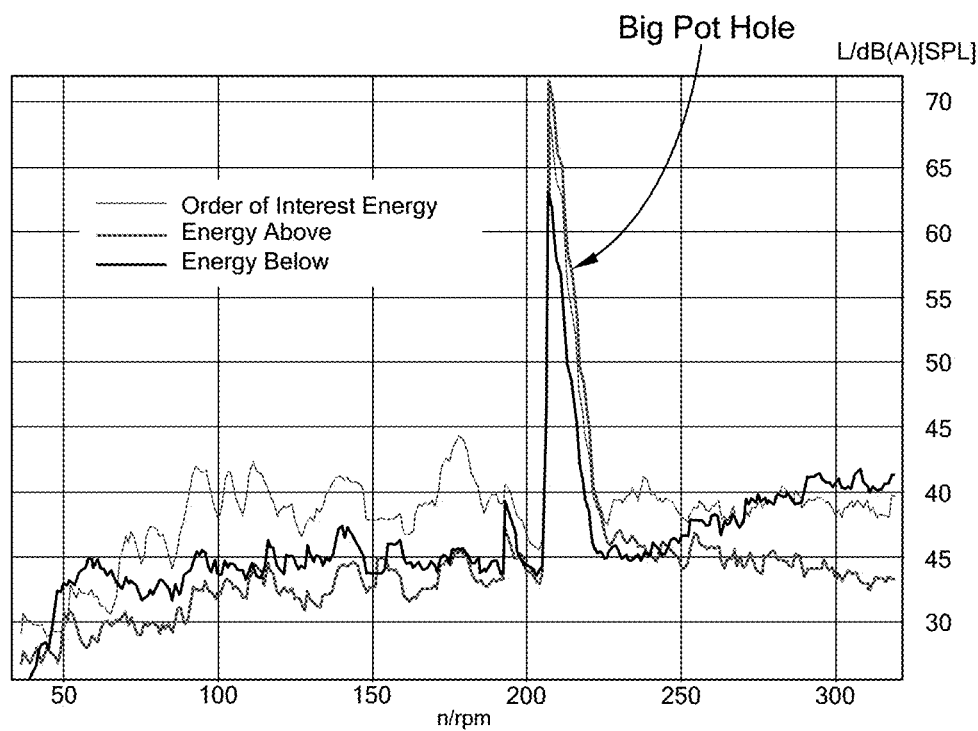
FIG. 6 shows graphs for an order of interest energy, an order above the interest energy, and an order below the interest energy.

Referring to FIG. 6, graphs for an order of interest energy, energy above, and energy below, are shown. As shown, the big pot hole causes spurious spikes in the noise signals.

Figure 7:
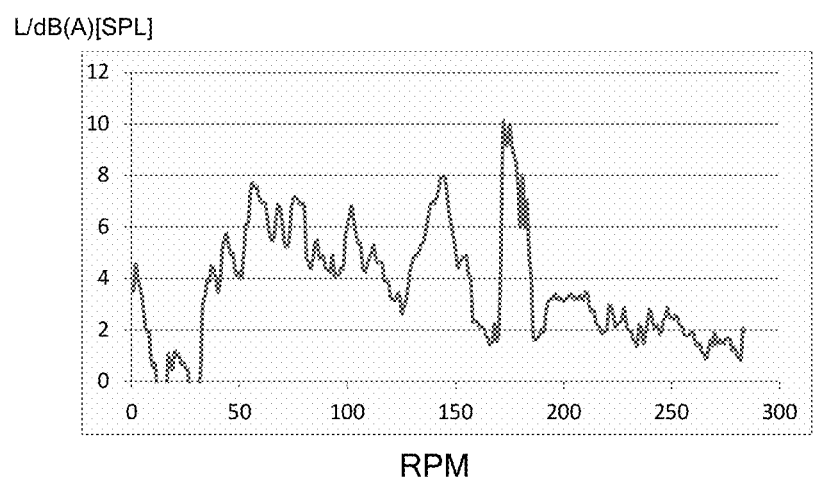
FIG. 7 is a graph of a resultant energy of the order of interest obtained according to the method of the present disclosure.

Referring to FIG. 7, a plot of resultant energy of the order of interest energy is shown. The resultant waveform is integrated (summed over the X axis) and represents the energy present at the order of interest without the background noise.

In summary, the system and method for processing and analyzing noise and vibration signals constructed in accordance with the teachings of the present disclosure includes an NVH analyzer that can advantageously eliminate overloads in the NVH data sets and eliminate the background noise at a particular order of interest by averaging two adjacent order sidebands, one close to but below the order of interest, and one close to but above the order of interest, and subtracting the average from the order tracking at the order of interest. This produces a plot of the energy present at that order of interest with no background noise present. Taking data at sidebands close to the order of interest ensures the background subtraction is relevant and the magnitude of the average when subtracted represents the background noise.

Therefore, the system and method according to the present disclosure provides an objective NVH metric to enhance the ability to reliably determine whether a machine being evaluated provides NVH within an acceptable range. The system and method of the present disclosure provides an objective, repeatable, and automated means to determine the NVH vehicle evaluation ratings for various machines in a vehicle. The metric is robust to extraneous noise. Therefore, the system and method of the present disclosure is particularly beneficial for determining whether borderline units produce NVH signals within the acceptable range.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method comprising:
    executing an order tracking process of a measured noise signal at an nth order and at least one adjacent order to obtain an nth tracked signal and an interference signal based on an adjacent tracked signal of the at least one adjacent order; and
    extracting the interference signal from the nth tracked signal to obtain a refined nth order tracked signal.

2. The method of claim 1, wherein the order tracking process is executed on two adjacent orders to generate a first adjacent tracked signal and a second adjacent tracked signal, the nth order is provided between the two adjacent orders, and the method further comprises:
    determining an average of the first and second adjacent tracked signals, as the interference signal; and
    subtracting the interference signal from the nth tracked signal to obtain the refined nth order tracked signal.

3. The method of claim 1, wherein the nth order is an order of interest associated with a known component of a machine associated with the measured noise signal, and the at least one adjacent order is unassociated with the machine.

4. The method of claim 1 further comprising classifying a noise quality of the machine based on the refined nth order tracked signal.

5. The method of claim 1 further comprising calculating a scalar value of the refined nth order tracked signal for the nth order.

6. The method of claim 5 further comprising classifying a noise quality of the machine based on the scalar value of the refined nth order tracked signal.

7. The method of claim 1 further comprising recording, by a recording device, noise from the machine as the machine is being operated at one or more rotational speeds to obtain the measured noise signal.

8. The method of claim 7, further comprising acquiring, by a controller, the measured noise signal recorded by the recording device to perform the executing the order tracking process and the extracting the interference signal from the nth tracked signal.

9. The method of claim 1, wherein the interference signal is indicative of background noise originating from environmental conditions external of the machine.

10. The method of claim 1, wherein the order tracking process is executed on a plurality of the adjacent orders to generate a plurality of tracked signals, the nth order is an order of interest associated with a known component of a machine associated with the measured noise signal, and the plurality of adjacent orders are unassociated with the machine, and the method further comprises:
    determining, as the interference signal, an average adjacent tracked signal based on the plurality of adjacent tracked signals; and
    subtracting the interference signal from the nth tracked signal to obtain the refined nth order tracked signal.

11. A method for evaluating noise of a machine having one or more rotatable components, the method comprising:
    conducting an order tracking process on a measured noise signal at an nth order and at least two adjacent orders to obtain an nth tracked signal and at least two adjacent tracked signals;
    calculating an interference signal based on the at least two adjacent tracked signals;
    subtracting the interference signal from the nth order tracked signal to obtain a refined nth order tracked signal for the nth order; and
    assessing a noise quality of the machine based on the refined nth order tracked signal.

12. The method of claim 11, wherein the nth order is an order of interest associated with a known component of the machine, and the at least two adjacent orders are unassociated with the machine.

13. The method of claim 11 further comprising calculating a scalar value for the nth order based on the refined nth order tracked signal.

14. The method of claim 13, wherein the assessing the noise quality of the machine further comprises categorizing the machine based on the scalar value in one of at least two classifications defined by different range of scalar values.

15. The method of claim 11 further comprising recording, by a recording device, noise from the machine as the machine is being operated at one or more rotational speeds to obtain the measured noise signal.

16. The method of claim 15, further comprising acquiring, by a controller, the measured noise signal recorded by the recording device to conduct the order tracking process on the measured noise signal, to calculate the interference signal, and to subtract the interference signal from the nth order tracked signal.

17. The method of claim 11, wherein the interference signal is an average of the at least two adjacent tracked signals.

18. A method comprising:
    executing an order tracking process of a noise signal at an nth order and two adjacent orders to obtain an nth tracked signal and two adjacent tracked signals, wherein the nth order is between the two adjacent orders; and
    subtracting an interference signal from the nth tracked signal to obtain a refined nth tracked signal, wherein the interference signal is based on the two adjacent tracked signals.

19. The method of claim 18 further comprising assessing a noise quality of the machine based on the refined nth tracked signal.

20. The method of claim 18, wherein the nth order is an order of interest associated with a known component of a machine associated with the measured noise signal, and the two adjacent orders are unassociated with the machine.

* * * * *